United States Patent [19]
Sjogren et al.

[11] Patent Number: 5,181,820
[45] Date of Patent: Jan. 26, 1993

[54] AUTOMATIC BUNDLE LOADING APPARATUS AND METHOD

[75] Inventors: Christer A. Sjogren, Miami; Kevin Cote, Fort Lauderdale, both of Fla.

[73] Assignee: Quipp Systems, Inc., Miami, Fla.

[21] Appl. No.: 676,192

[22] Filed: Mar. 27, 1991

[51] Int. Cl.$^5$ .............................................. B65G 1/10
[52] U.S. Cl. .................................. 414/331; 104/162; 104/173.1; 198/733; 198/435; 414/397; 414/398; 414/399; 414/400; 414/373; 414/790.8; 414/793.8; 414/794.2; 280/79.7
[58] Field of Search ............... 414/397, 398, 399, 400, 414/373, 799, 788.9, 789.9, 790, 790.3, 790.8, 792.7, 793.4, 793.8, 794.7, 794.8, 794.4, 901, 902, 794.2; 104/162, 173.1; 198/717, 725, 728, 733, 435; 280/79.11, 79.2, 79.7

[56] References Cited

U.S. PATENT DOCUMENTS

| | | | |
|---|---|---|---|
| 3,955,613 | 5/1976 | Lund | 164/130 |
| 4,557,656 | 10/1985 | Ouellette | 414/796.7 X |
| 4,634,333 | 1/1987 | Butterly, Jr. et al. | 414/331 |
| 4,701,091 | 10/1987 | Yamauchi et al. | 414/398 X |
| 4,732,172 | 3/1988 | Pedersen | 134/62 |
| 4,753,356 | 6/1988 | Nootenboom et al. | 211/134 |
| 5,018,927 | 5/1991 | Tanaka | 414/331 |
| 5,085,553 | 2/1992 | Bouwens et al. | 414/331 |

FOREIGN PATENT DOCUMENTS

| | | | |
|---|---|---|---|
| 232913 | 8/1987 | European Pat. Off. | 414/793.8 |
| 0253790 | 1/1988 | European Pat. Off. | 414/399 |
| 359920 | 3/1990 | European Pat. Off. | 414/790.8 |
| 3136950 | 10/1982 | Fed. Rep. of Germany | 414/790.8 |
| 244712 | 12/1985 | Japan | 414/400 |
| 1000361 | 3/1983 | U.S.S.R. | 414/400 |

*Primary Examiner*—Frank E. Werner
*Attorney, Agent, or Firm*—Louis Weinstein

[57] ABSTRACT

In an automatic loading system and method wheeled carts receive five or six layers of newspaper bundles of four to six bundles per layer. A waist-high conveyor and an inclined ramp conveyor move bundles to a roller platform of independently operated roller sections selectively halted upon receipt of a bundle. When the desired number of bundles have been delivered to the roller platform, a pusher laterally moves the bundles to a split roller platform. A second group of bundles are delivered to the roller platform and the split roller platform. The sections of the split roller platform are then abruptly pulled apart causing the bundles to drop upon a fork-like platform extending into one side of a cart receiving the bundles. The pusher is retracted to the start position and the fork-like platform is lowered to receive the next layer of bundles in a like manner. Once the cart is filled with the desired number of layers, the fork-like platform is withdrawn from the cart, the cart is advanced to a take-off location and the next cart is indexed to the receiving location, being guided thereto along guide rails. Each cart comprises a platform rolling upon casters and having an open top defined by four sides which form a cage-like structure. One side has lockable double doors to facilitate bundle removal. Cart sizes are designed to make efficient use of the truck cargo space receiving the carts.

39 Claims, 13 Drawing Sheets

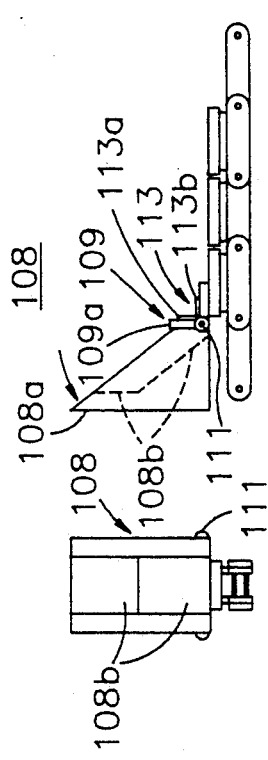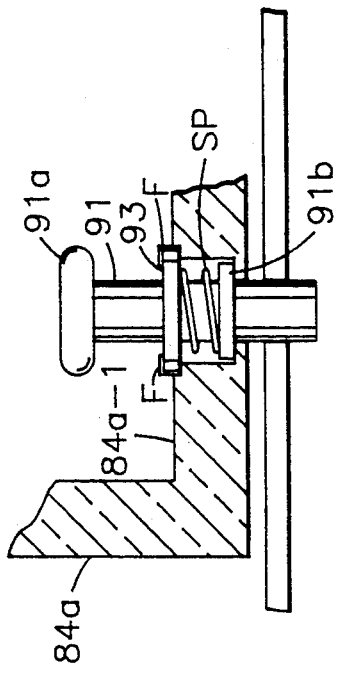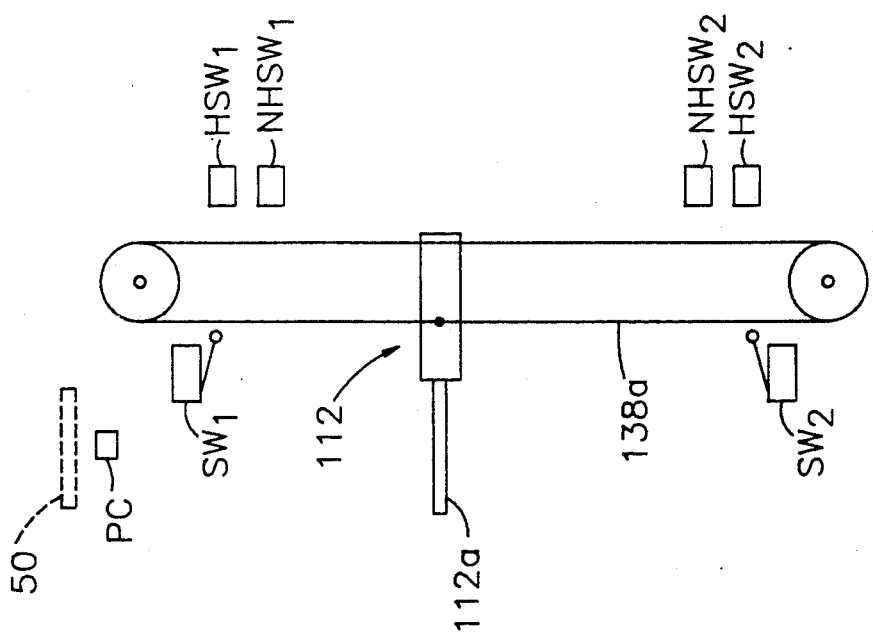

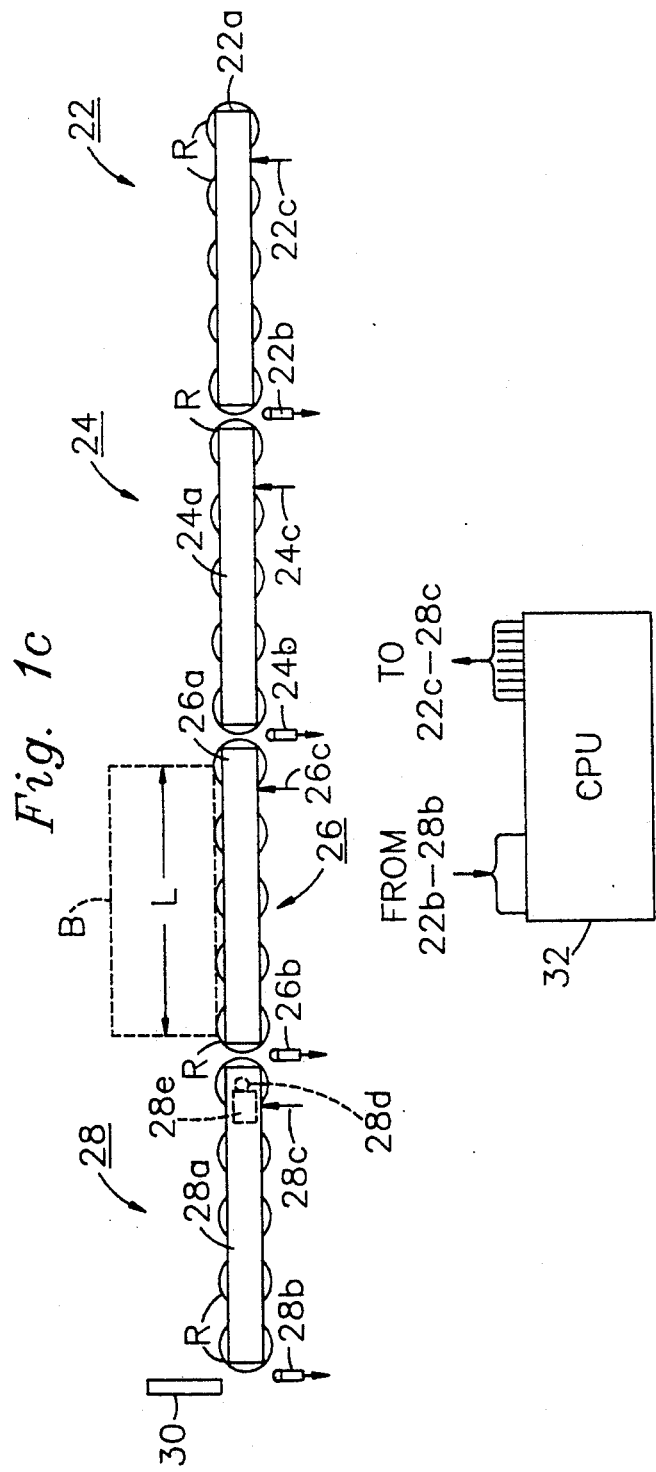

Fig. 2j LOADING ELEVATOR

AUTOMATIC BUNDLE LOADING APPARATUS AND METHOD

FIELD OF THE INVENTION

The present invention relates to automatic loading systems, and more particularly, to a novel loading system for automatically loading bundles into bundle receiving carts.

BACKGROUND OF THE INVENTION

The automatic loading system of the present invention is extremely advantageous for use in the newspaper industry. Newspapers pass through three basic stages before reaching the home consumer, typically referred to as the press room, mailroom and circulation stages. During the press room or printing stage, the newspapers are printed, cut and folded whereupon they are delivered to the mailroom for counting and bundling wherein the bundle signatures are stacked into bundles of predetermined counts, typically selected according to the requirements of the final destination.

Completed bundles are delivered from the mailroom facility into the circulation phase in which bundles are typically delivered from the mailroom into trucks by a conveyor, the bundles typically being removed manually from the conveyor and loaded into the truck cargo space.

Inserts, such as, for example, advertising inserts are typically placed in each newspaper. This is quite often the case for weekend newspapers and especially Sunday newspapers. The number of inserts is very often quite large and the size of the inserts typically vary and also deviate from the size of the newspaper. In addition, the inserts are often placed into the newspaper in a haphazard manner with the result that the major side surfaces of the newspaper assume a bulging shape which significantly deviates from a desirable pair of flat, substantially parallel surfaces. Bundles of a plurality of such signatures, when wrapped or tied together assume a shape which significantly deviates from a rectangular parallelepiped shape and, in fact, take on a shape somewhat similar to that of a watermelon, such wrapped bundles of newspapers containing numerous inserts typically being referred to as "watermelons". The inserts are usually placed into the newspapers at the request of local merchants or retailers to concentrate their advertising in those areas within a reasonable distance from their locations. Thus, a newspaper intended for distribution over a large area may contain different inserts according to its final destination within its distribution area.

As a result, utilization of manual stacking operations in which individual bundles are manually removed from a delivery conveyor and placed into the cargo space of a delivery van yields stacks of bundles which are unstable due to their "watermelon" shape.

In addition, manual loading techniques are slow and tedious and, since they are highly labor intensive, significantly increase the operating costs for the circulation phase.

Techniques which have been developed to reduce the circulation phase operating costs include the development of loading carts each of which are comprised of cage-like sidewalls mounted upon a platform provided with casters for enhancing portability. At least one side surface of the cart is provided with a hingedly mounted door which is unlocked and opened for the purpose of receiving bundles. When the cart is loaded, the door is swung closed and locked enabling the cart to be loaded (i.e. pushed) into the cargo space. The carts are dimensioned so as to make the most economic use of the total cargo space volume. The carts are preferably of a box-like shape and are capable of receiving a plurality of layers of newspaper bundles, each layer comprising a plurality of bundles. In one example the cart is designed to receive a layer of four bundles arranged in two-by-two fashion (i.e. two rows of two bundles per row), for example, or six bundles arranged in three-by-two fashion (i.e. three rows of two bundles per row or two rows of three bundles per row), the cart having a height capable of accommodating of the order of five or six such layers.

The sidewalls of the cart are sufficiently sturdy to support the bundles stacked therein without danger of toppling over even in the event that "watermelon-shaped" bundles are stacked therein.

When the truck reaches the final destination, the carts are removed from the cargo space and unloaded.

Although the above technique makes efficient use of the cargo space and simplifies the manual operations somewhat as well as assuring the integrity of the layers of bundles contained within each cart, the above technique, although a significant improvement upon the first-described manual technique, is nevertheless highly labor intensive and further remains a slow and tedious procedure.

It is therefore a principal object of the present invention to provide a novel, substantially fully automated loading technique which significantly increases and improves the loading time and efficiency which leads to a number of improvements which are also obtained as a direct result of the automated system.

The automated system of the present invention is characterized by comprising a ramp conveyor which receives signature bundles from a conventional delivery conveyor set at a typical height of the order of three feet above a ground or floor surface, the ramp conveyor delivering signature bundles to a first roller platform assembly positioned above a loading location adapted to receive a cart.

The platform roller assembly is comprised of a plurality of independently operable power roller sections arranged in tandem fashion, each roller section being capable of accommodating a signature bundle. The number of roller sections provided is dependent upon the capacity of the carts receiving the bundles and is sufficient to receive the number of bundles found in each row making up one bundle layer within the cart as well as additional roller sections sufficient to act as a buffer storage for storing an equal number of additional bundles thereby doubling the system operating speed.

Each roller section is equipped with sensing means for sensing the presence of a bundle thereon whereupon the power delivered to a roller section receiving a bundle is turned off after a predetermined delay.

When the roller sections have received a quantity of bundles sufficient to complete a row, an automatic pusher pushes the bundles making up the completed row in a direction transverse to the delivery direction and onto a split platform assembly comprised of a pair of slidable platform sections, each preferably incorporating a plurality of free-wheeling rollers.

Initially the split platform assembly is in the closed position. The pusher means pushes a first row of bundles onto the far end of the split platform adjacent to which is an end wall member which prevents the first row of bundles from being pushed beyond the far end of the split platform. The pusher means rapidly returns to the start position, whereupon a number of bundles sufficient to complete the next row is moved onto the roller sections from which bundles are delivered to the split platform assembly, additional bundles being delivered to the buffer roller assemblies for temporary storage thereon.

As soon as the bundles reach the roller sections aligned with the pusher means, the pusher means moves the bundles from the roller sections onto the split platform assembly to complete one layer of bundles. The pusher assembly moves approximately half the distance in delivering the second row of bundles as compared with the length of travel experienced by the pusher means in delivering the first row of bundles whereupon the split platform assembly now contains a quantity of bundles sufficient to form one layer for delivery to a cart.

At this time, the split platform assembly is operated, causing the slidable platform halves to move apart abruptly, allowing the bundles to drop into a cart which has been indexed to the loading position. The bundles which are dropped from the split platform fall only a short distance onto a platform comprised of a plurality of tines arranged to form a fork-like platform adapted to be reciprocated into the cart being loaded, the fork-like platform being arranged with its tines interspersed with the vertically aligned spaced parallel bars of an adjacent cart sidewall, the interrelationship between the cage-like bars and the fork-like tines providing non-interfering clearance therebetween.

When the bundles making up a layer have been collected upon the fork-like platform, the platform is indexed downwardly a distance equivalent to one layer, whereupon the aforementioned operations are repeated to load additional layers of bundles within the cart.

Alternatively, the system control, by way of a software routine, may index each layer of bundles with the vertically movable fork-like platform to its lowest position (just above the previous layer) and then retract the tines carrying the layer of bundles to be "dropped" on top of the platform of the cart, or the previous layer, as the case may be.

When the desired number of layers have been deposited in the cart, the fork-like platform is withdrawn from the cage-like cart, the bars of the cage sidewall cooperating to provide a "scraping" action, the bars serving to remove or "scrape" the layers of bundles stacked upon the fork-like platform from the platform as it is withdrawn from the cart, the layers of bundles removed from the platform being retained within the cart and being stacked in substantially neat fashion. Even assuming the bundles being stacked are "watermelon-shaped" the cart nevertheless serves to retain stacks of signature bundles contained therein in a substantially neat and compartmentalized manner, which is especially important for delivery groupings wherein the contents of each cart may be of a particular bundle count and are scheduled for delivery to different destinations.

When the loading of the cart is completed, drive means moves the loaded cart from the loading position towards the next station, which is typically the truck loading dock. Simultaneously therewith the next empty cart is advanced and indexed to the cart loading position. The carts are moved along guide tracks to facilitate alignment in one direction. Sensor means are provided to accurately align the cart at the loading position whereupon the initial operating steps are repeated namely, the fork-like platform is reinserted into the cart located at the loading position and positioned near the top, open end of the cart, bundles are advanced along the delivery and ramp conveyors to the forwardmost roller sections (if they have not already been delivered thereto), and a row of bundles is then pushed onto the split platform, these steps being repeated for the present and each subsequent cart to be loaded.

Each cart is preferably provided with either a fixed or a variable coding means which may respectively comprise a bar code pattern unique to each cart or a changeable memory means such as a RAM. Electronic sensor means identifies each cart and associates the data bundles stored therein with the cart identification developing a data group in which the number of bundles and their destination are associated with the cart number.

As one example, each cart delivered to the loading dock may be sensed by a hand-held unit providing identification of the bundle quantity and destination to facilitate delivery of each cart to the proper truck.

The carts preferably have one sidewall comprised of hingedly mounted double doors which are each independently lockable and releasable enabling the contents of each cart to be unloaded in stages. Although it is preferable that each cart be provided with sidewalls and doors which are of an open, cage-like design, it is necessary to provide only one such cage-like sidewall to facilitate unimpeded entry and removal of the fork-like platform from the cart. In the event that all of the sidewalls are comprised of a plurality of vertically aligned bars, horizontal reinforcing members are provided along at least three of the sidewalls to provide a cart with adequate structural strength.

In the preferred embodiments, the carts are designed to stack five or six layers of bundles with each layer made up of either two rows of two bundles per row or three rows of two bundles per row. However, a greater or lesser number of bundles per layer and layers per cart may be utilized to accommodate the particular application.

The loading system of the present invention improves efficiency and productivity to such a large extent that the same truck may be utilized to complete two or more deliveries in the time required to complete one delivery or less using prior art techniques thus significantly reducing capital expenditures for the number of trucks required as well as significantly reducing direct expenditures for personnel, fuel costs, and other related overhead expenditures.

Although the present invention has been described as being extremely advantageous for use in the distribution of newspapers and particularly newspaper bundles, it should be understood that the system is capable of loading other types of packages and/or boxes into the holding carts described herein and the packages need not be of uniform size although it is preferred that the packages be limited to a maximum size.

OBJECTS OF THE INVENTION

It is, therefore, one object of the present invention to provide a novel method and system for automatically loading packages, bundles or the like into loading carts.

Still another object of the present invention is to provide a novel system for improving the efficiency of a delivery network utilized to deliver a number of packages to a variety of destinations and wherein the packages need not be of uniform size and shape.

Still another object of the present invention is to provide a novel method and apparatus for assembling and loading bundles, packages and the like in which the loading operation is substantially fully automated.

Still another object of the present invention is to provide a novel method and apparatus for handling and loading bundles, packages and the like into loading carts wherein the bundles or packages are loaded one layer at a time into said carts.

Still another object of the present invention is to provide a novel method and apparatus for stacking and loading bundles, packages and the like within the cargo space of vehicles wherein the system utilizes carts of novel design to facilitate loading, transportation and unloading of the carts.

Still another object of the present invention is to provide a novel system for identifying the carts and their contents which identification system forms an integral part of an automated loading system to facilitate prompt and efficient delivery of the carts to the proper locations.

BRIEF DESCRIPTION OF THE FIGURES

The above, as well as other objects of the present invention will become apparent when reading the accompanying description and drawings, in which:

FIGS. 1a and 1b show detailed side and front views of the cart pusher of FIG. 1;

FIG. 1c is a detailed end view of the roller platform assembly of FIG. 1;

FIG. 1d is a simplified elevational view of the mechanism of FIG. 1 showing an alternative embodiment;

FIGS. 2f-2j are flow diagrams showing routines for controlling the automatic loading system;

FIG. 2k is a sectional view of a door latch for use with the cart doors of FIGS. 2a and 2b;

DETAILED DESCRIPTION OF THE INVENTION AND THE PREFERRED EMBODIMENTS THEREOF

Figure 1:
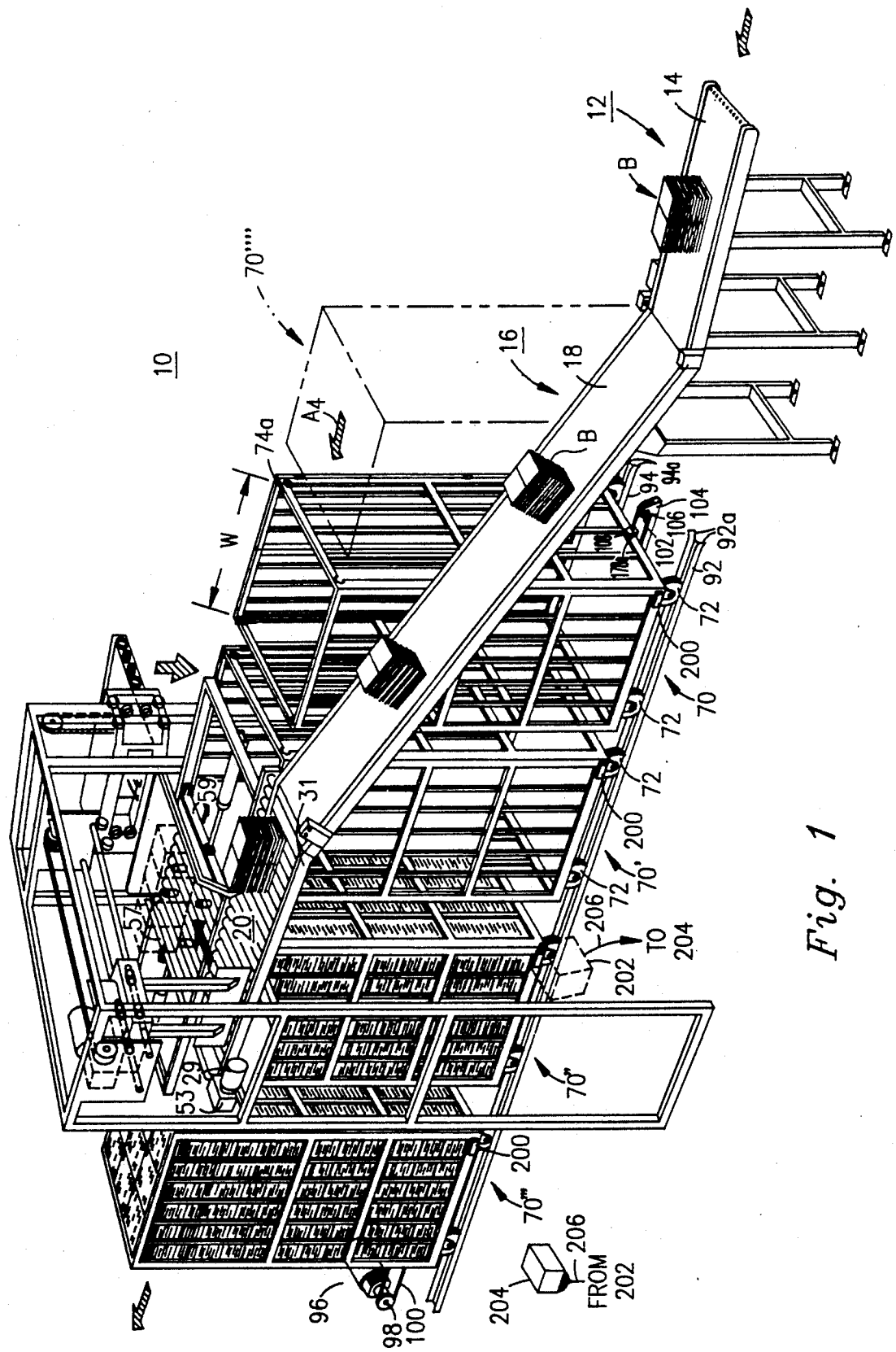
FIG. 1 shows a perspective view of a system designed in accordance with the principles of the present invention.

FIG. 1 shows a system 10 designed in accordance with the principles of the present invention and comprised of an infeed conveyor 12 arranged to receive bundles B from counting, stacking and bundling equipment (not shown). The delivery conveyor has a moving conveyor belt 14 which advances bundles from right to left. The bundles are typically delivered along conveyor 12 at a rate of the order of thirty-two to thirty-five per minute. The bundles are typically delivered at a height of the order of three feet or so above the floor or supporting surface upon which the system 10 is located. A ramp conveyor 16 is provided with a movable belt 18 for moving bundles along an upwardly inclined path to a roller platform assembly 20.

Each bundle B is comprised of a plurality of signatures or newspapers suitably wrapped or tied to maintain the integrity of the bundle. Although not shown for purposes of simplicity, the signatures in each bundle may contain a plurality of inserts which causes each newspaper to have a bulging side or sides yielding a composite bundle of signatures having a "watermelon-shaped" configuration. Obviously, any other bundles and/or boxes or packages of a similar size or range of sizes may be loaded into carts or containers through the utilization of the system of the present invention.

It should further be understood that the conveyors 12 and 16 may be of a variety of different lengths in order to accommodate the existing installations of mailrooms and circulation facilities. In the preferred embodiment, the bundles are delivered from a conveyor 12 of a height of the order of three or so feet above the ground along the ramp conveyor 18 to a height of about six feet.

Figure 5:
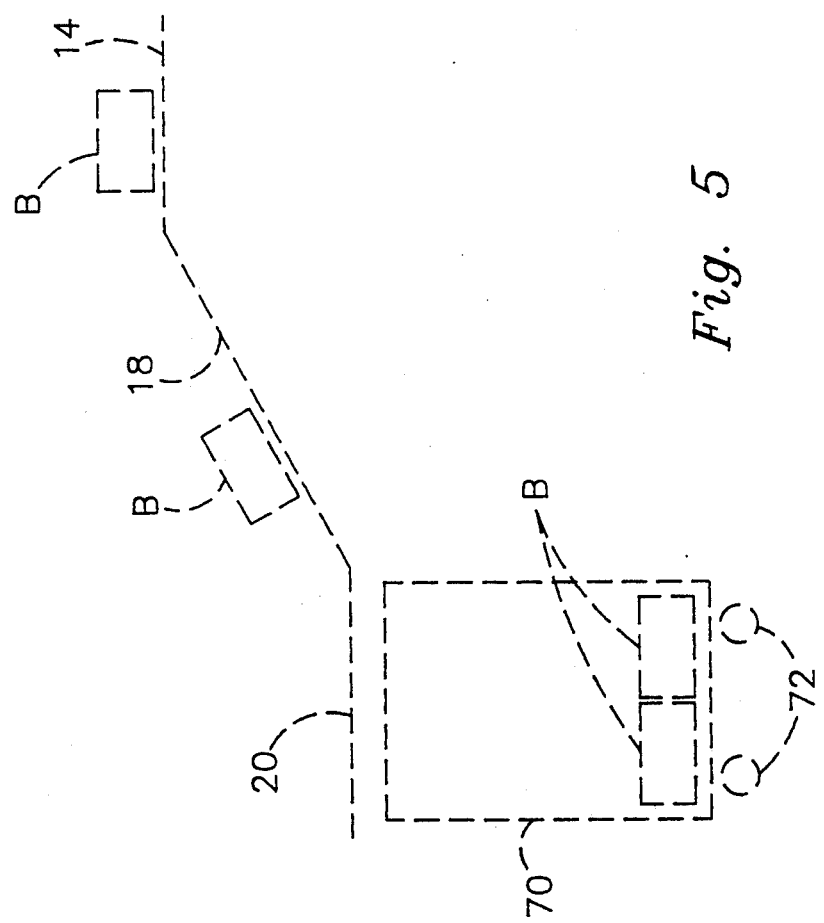
FIG. 5 is a view of the conveyor that lowers the bundles above the cart in FIG. 1.

Also, the bundles may be delivered at the height of platform 20 eliminating the need for a ramp conveyor. Alternatively, the bundles may be delivered from a source above platform 20 whereby ramp conveyor 18 may convey bundles downwardly from the bundle source to platform 20, as shown in simplified schematic fashion in FIG. 5.

The bundles are delivered from the ramp conveyor 18 to the roller platform assembly 20 which, in turn, is comprised of a plurality of individual selectively powered roller assemblies 22, 24, 26 and 28 shown in greater detail in FIG. 1c. Each assembly is comprised of a power unit 22a through 28a for powering those rollers R associated with the roller section, power being selectively controlled by CPU 32 applying the control signals to control inputs 22c through 28c for automatically and independently controlling each roller section.

Figure 3:
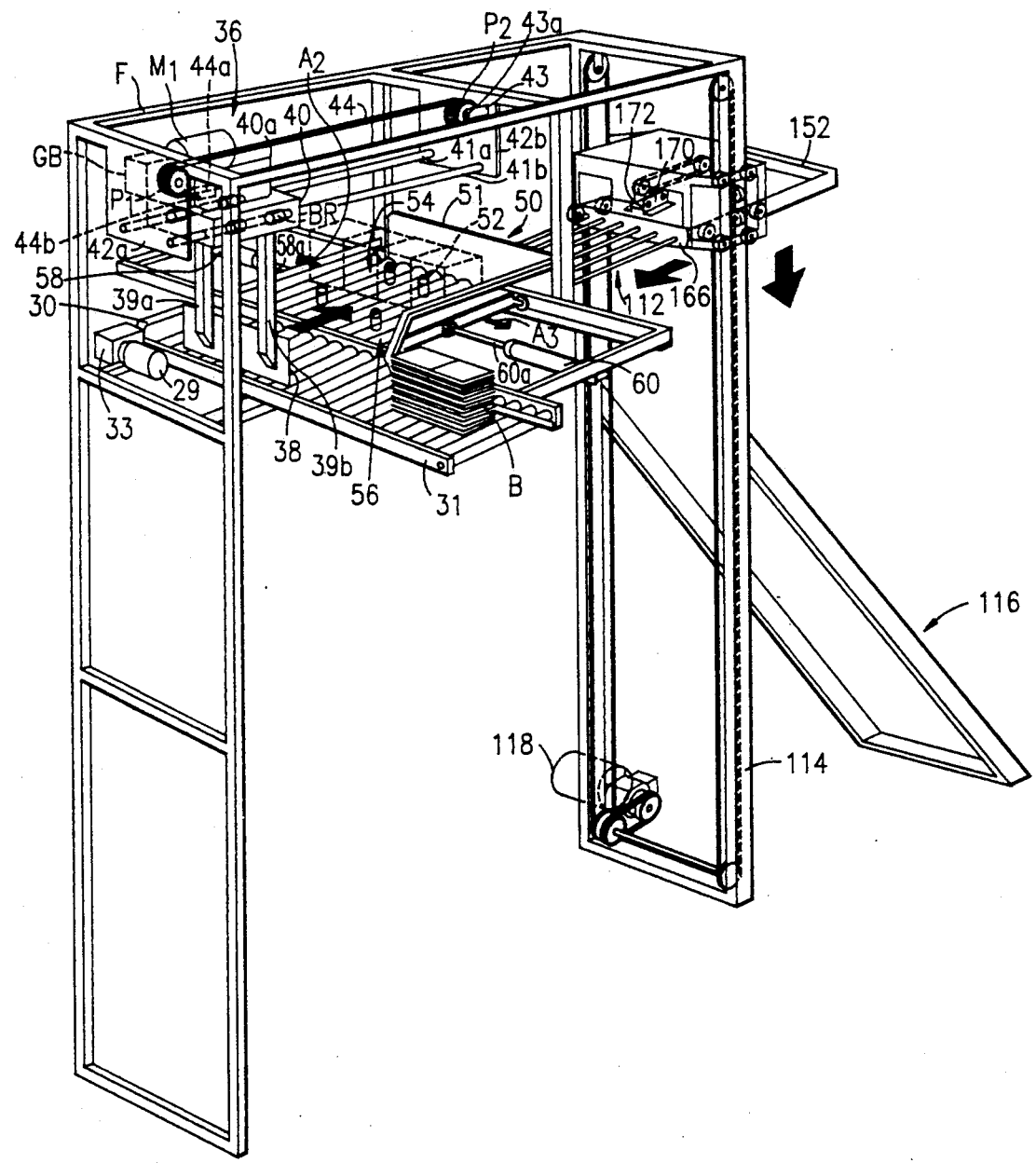
FIG. 3 is a perspective view showing the roller platform assembly, pusher assembly, split platform assembly and elevator assembly of FIG. 1 in greater detail.

The individual roller sections 22–28 may be operated by a single motor 29 coupled to a drive chain arranged within elongated channel 31, by means of a gear reducing assembly 33 whose output is coupled to a drive sprocket located at the left-hand end of channel 31, and a free-wheeling driven sprocket (not shown) being arranged at the left-hand end of platform 31, relative to FIG. 3.

Each of the roller sections 22–28 is preferably provided with a clutch mechanism 28e coupled between a driven sprocket such as 28d for roller section 28 which engages and is rotated by the chain arranged within channel 31. The clutch couples power from the driven sprocket 28d to the associated roller section by means of a control signal applied at 28c for engaging the clutch assembly. If desired, however, any other type of independent control means may be utilized which is capable of yielding independent and selective operation of the individual roller sections 22 through 28.

A sensor 22b through 28b is associated with each roller section 22–28 for detecting the presence of a signature bundle, as will be more fully described. The length of each roller section 22 through 28 is sufficient to accommodate a bundle B so that the length of each section is at least equal to and preferably slightly greater than the length L of a typical bundle.

The number of roller sections 22–28 is a function of the number of bundles making up each row of the plural rows of layers stacked within the cart.

Figure 2A:
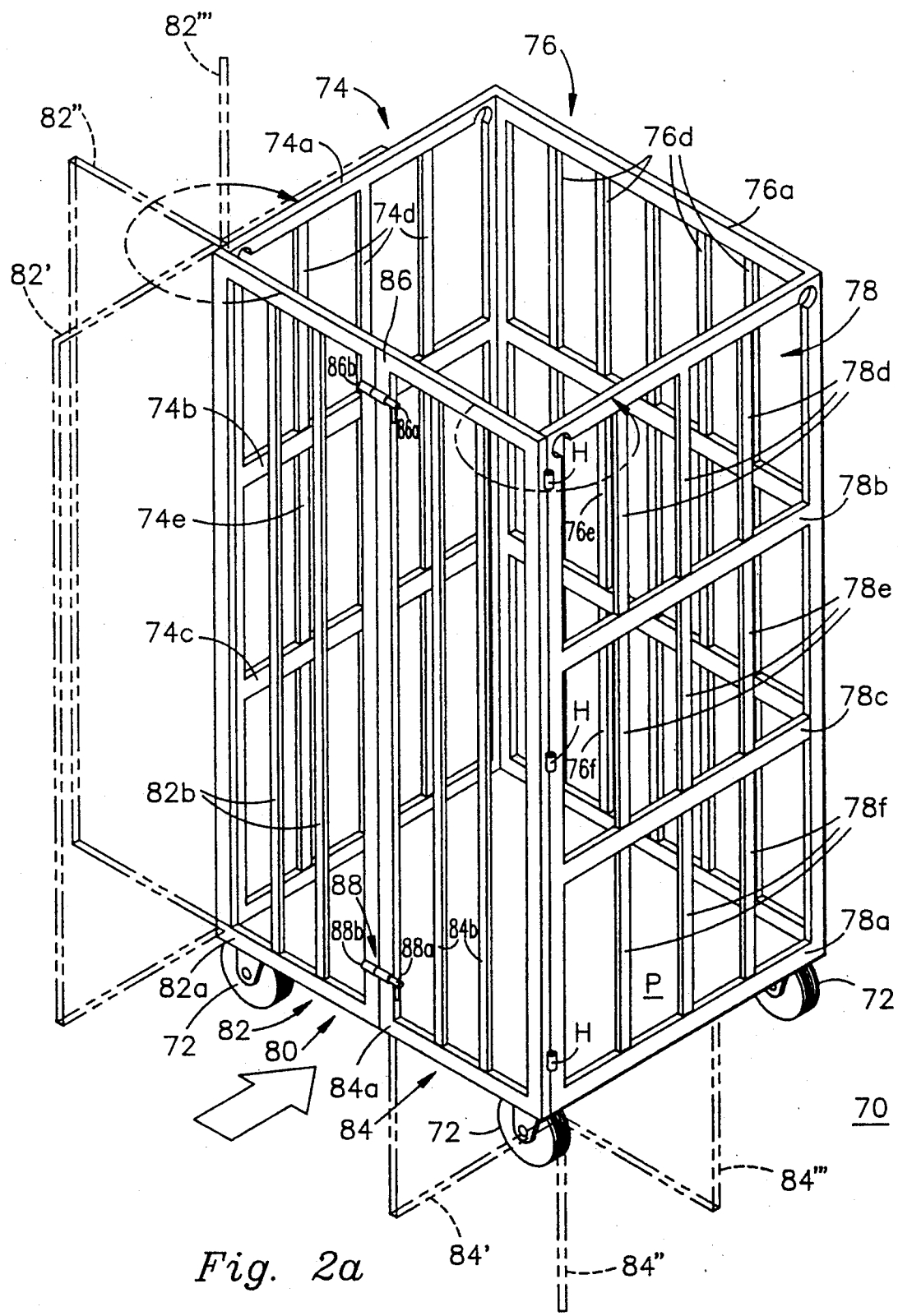
FIGS. 2a and 2b show perspective views of the novel carts of the present invention employed in the system of FIG. 1.
Figure 2B:
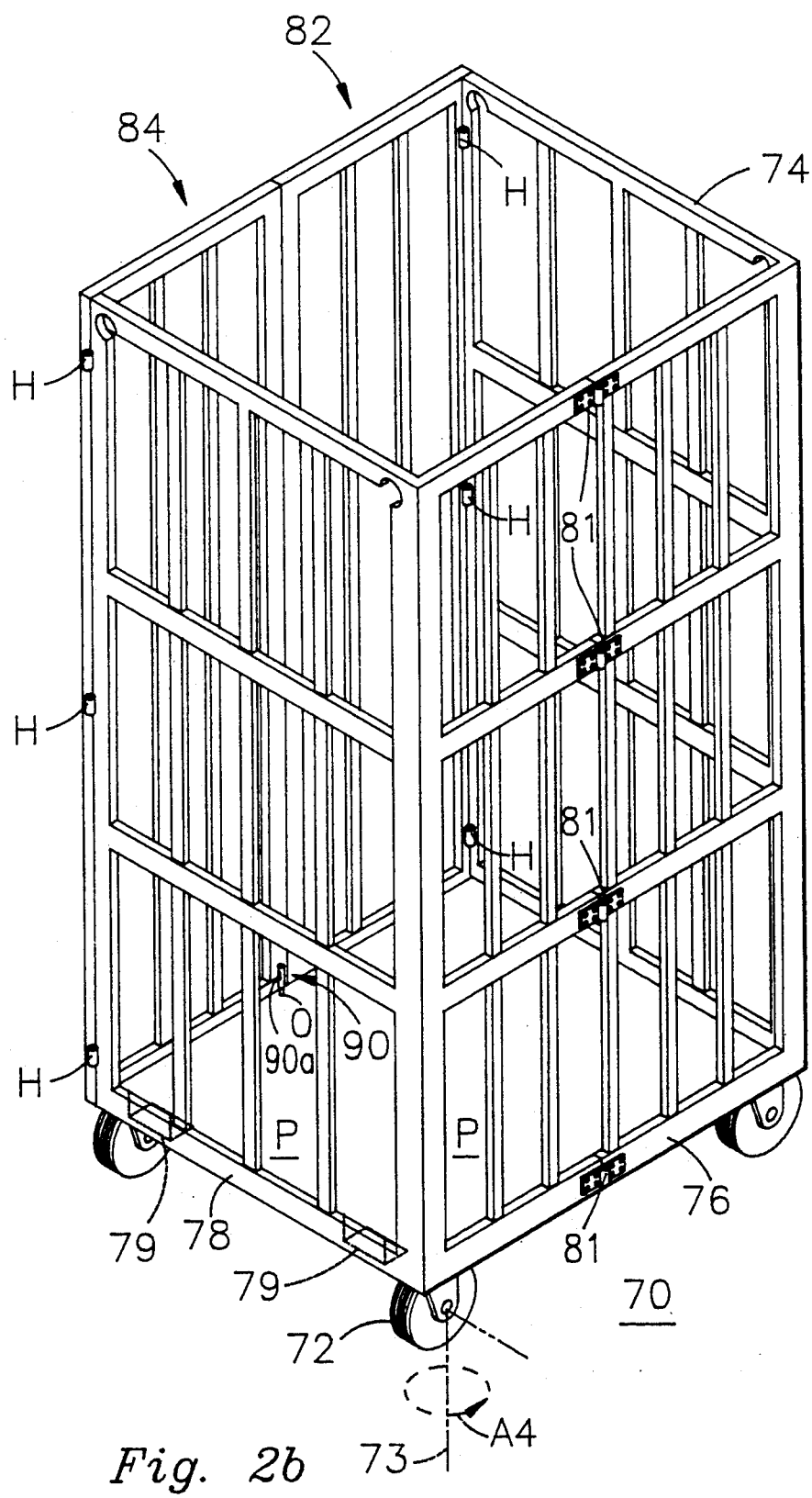
Figure 2C:
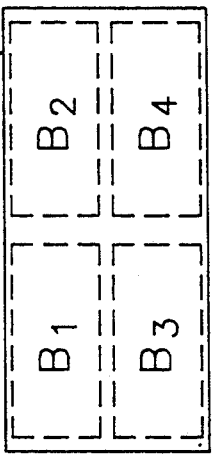
FIGS. 2c, 2d and 2e show top plan views of carts which are useful in describing the various cart sizes and the manner in which a layer of bundles are arranged therein.
Figure 2E:
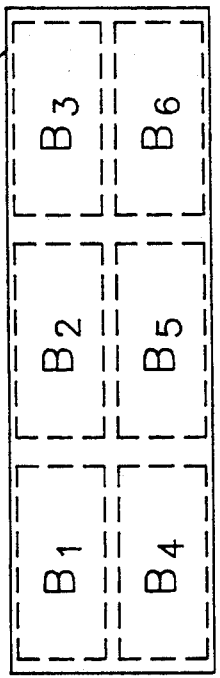
Figure 2D:
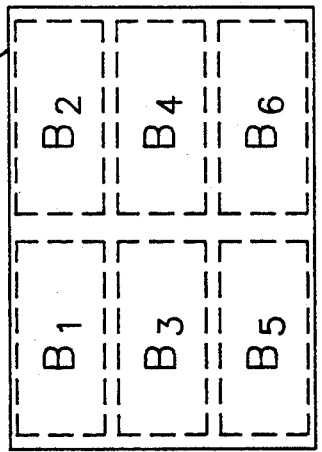

FIGS. 2c–2e show a top plan view of a cart looking down upon the platform P thereof. Considering FIG. 2c, the bottom layer of bundles delivered to the cart is comprised of four bundles arranged in two-by-two fashion, i.e. two rows of two bundles per row. As will be clearly understood from the description to be set forth hereinbelow, bundles B1 and B2 are initially delivered to the downstream end of the roller platform assembly and bundles B3 and B4 are subsequently delivered to the downstream end of the roller platform assembly 20 in order to provide the two-by-two arrangement as shown in FIG. 2c. Another alternative arrangement is shown in FIG. 2d wherein the bottom layer is comprised of six bundles arranged in two-by-three fashion with the bundles B1 and B2 initially delivered to the downstream end of the roller platform assembly followed by bundles B3 and B4 and ultimately bundles B5 and B6.

FIG. 2e shows still another arrangement in which the bottom layer is comprised of six bundles arranged in three-by-two fashion wherein bundles B1 through B3 are initially delivered to the downstream end of the roller platform assembly 20, followed by bundles B4 through B6. The arrangement of FIG. 2e is preferred over the arrangement of FIG. 2d since the pusher means operates one less time to push the rows onto the split platform assembly as will be more fully described hereinbelow. Other arrangements are possible, the next obvious arrangement being a three-by-three arrangement. It should further be understood that each cart receives a plurality of layers of bundles, each layer being deposited atop the previous layer. In a typical design of a two-by-three layer cart having six layers, the cart is thus capable of accommodating a total of thirty-six bundles. In a two-by-two arrangement, the cart is capable of accommodating twenty-four bundles and in a three-by-three arrangement, a cart is capable of accommodating fifty-four bundles, for example.

Considering first the arrangement of FIG. 2c comprised of two rows of bundles each row having two bundles (the first row being comprised of bundles B1 and B2 and the second row being comprised of bundles B3 and B4), the platform roller assembly 20 is preferably comprised of four roller sections 22 through 28 thus being capable of temporarily storing two bundles (such as bundles B3 and B4) while the two previously delivered bundles (B1 and B2) are pushed onto the split platform as will be more fully described hereinbelow. Providing at least two additional roller sections for buffer storage significantly reduces cycle time thus significantly increasing productivity.

The operation of the roller sections under the control of the sensors and CPU 32 is as follows:

As the first bundle B advances along ramp conveyor 16, power is delivered to all four roller sections 22–28 causing the first bundle to successively move from section 22 to 24 to 26 and ultimately to section 28. Movement of the bundle beyond section 28 is prevented by barrier plate 30. CPU 32 looks for the presence of a bundle at sensor 28b as shown in the flow diagram of FIG. 2f. The counter, delay and compare circuits will shut down the system if a bundle is not delivered after a predetermined delay period. This technique may be employed at other like locations throughout the program to shut down the system in the event that a bundle is not delivered to a particular destination within an acceptable time interval. Use of this arrangement has been omitted at like locations in the program for purposes of simplicity. When a bundle is present, section 28 is turned off after a predetermined delay D1, the roller section being activated for a delay time period D1 sufficient to assure that the bundle has not rebounded away from barrier 30 and is stably being maintained in the proper position. Turning off section 28 after the delay prevents the bundle from being damaged due to prolonged sliding engagement of the rotating rollers with the bottom surface of the bundle.

Section 28 is turned off, sensor 26b is activated and is examined to determine presence of a bundle. When a bundle is detected, section 26 is similarly turned off after a similar delay D1 imposed to achieve the same objective in imposing the delay D1 prior to turn off of section 28. Thereafter, sensor 24b is activated and the same iterative steps are performed with regard to sections 24 and 22. These steps have been omitted from the flow diagram for purposes of brevity.

When roller section 26 is turned off, the program advances to the pusher routine to be described more fully hereinbelow.

The pusher assembly 36 comprises a pusher plate 38 mounted to a pair of downwardly depending arms 39a, 39b secured to a housing 40. A pair of elongated rods 41a, 41b are mounted in spaced parallel fashion and have their ends secured to a pair of support plates 42a, 42b secured to the system framework F. Rods 41a, 41b extend through openings in housing 40 which is adapted to be freely slidable along rods 41a and 41b. It should be understood that suitable bearings and/or bushings B shown in dotted fashion are provided in the housing to render housing 40 freely slidable along rods 41a and 41b.

A motor M1 is secured to the framework F which motor is a pusher and control servo whose output is coupled to a drive timing pulley P1 through a gear box GB. A driven timing pulley P2 is rotatably mounted to mounting plate 42b through a suitable bracket 43 and pin means 43a. A timing belt 44 is entrained about timing pulleys P1 and P2. The lower run 44a of the timing belt 44 is secured to a timing belt mounting plate 40a provided on the top of housing 40 and is secured thereto as shown at 44b.

The operation of the pusher is such that position and velocity servo M1 is energized and is driven in a direction causing the pusher plate 38 to push up against the first two bundles B1 and B2 delivered to roller sections 28 and 26 respectively. The position and velocity servo is rapidly operated for a period of time sufficient to push the bundles upon a split platform assembly 50 to be more fully described and more particularly to push the first two bundles, B1 and B2, against a backing plate 51.

Figures 2F, 2H:
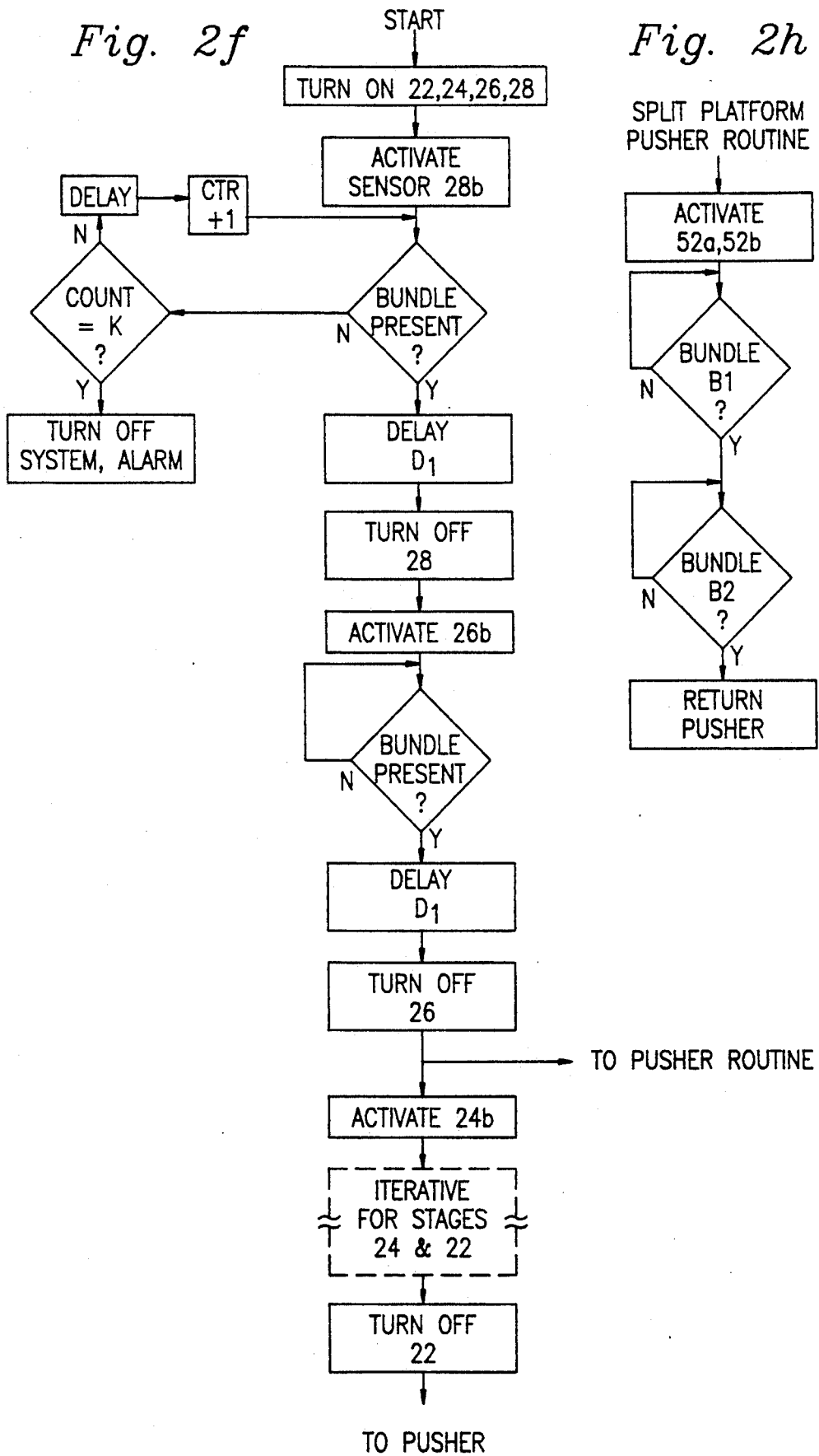
Figure 2G:
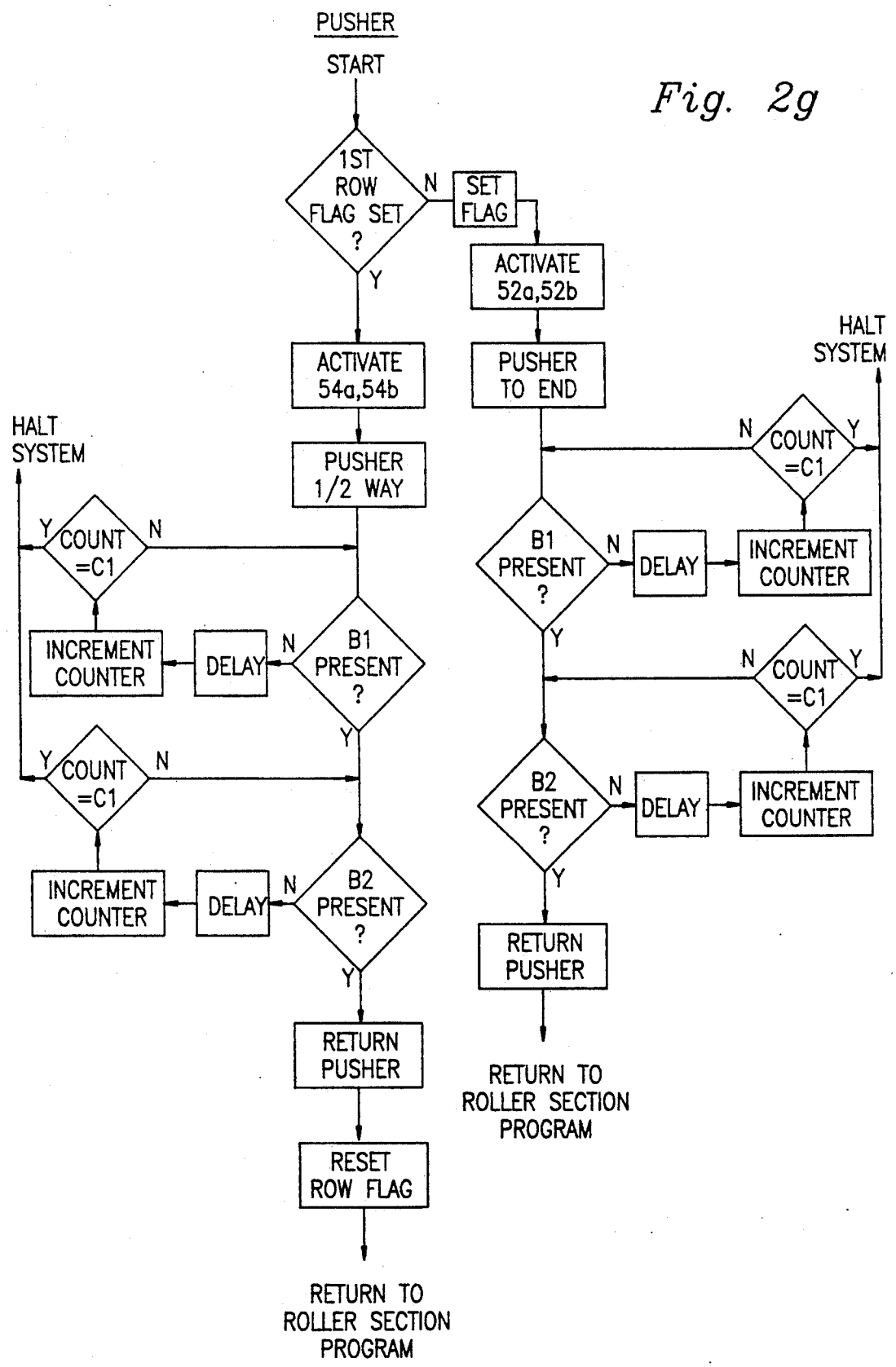
Figure 2I:
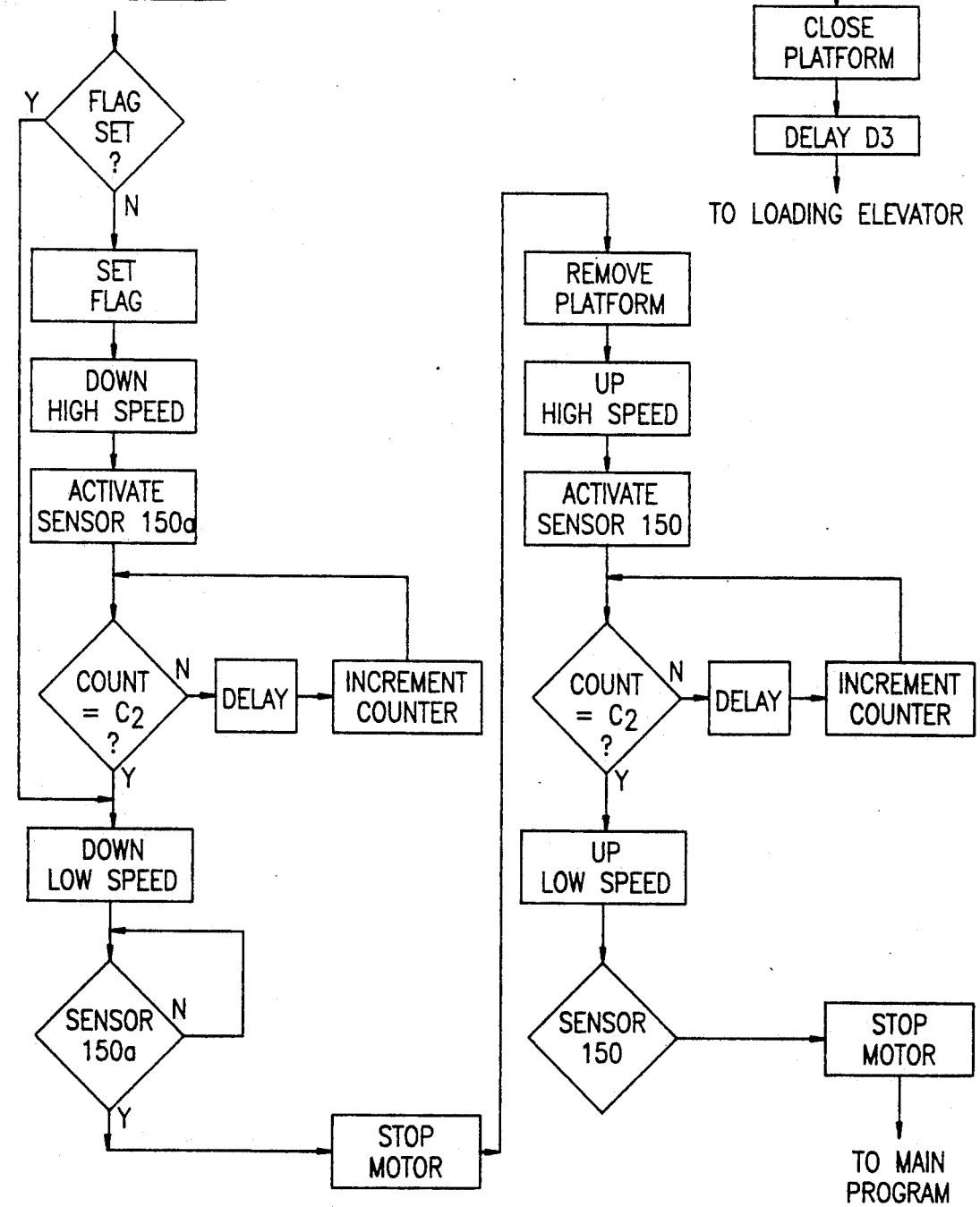
Figure 2I:
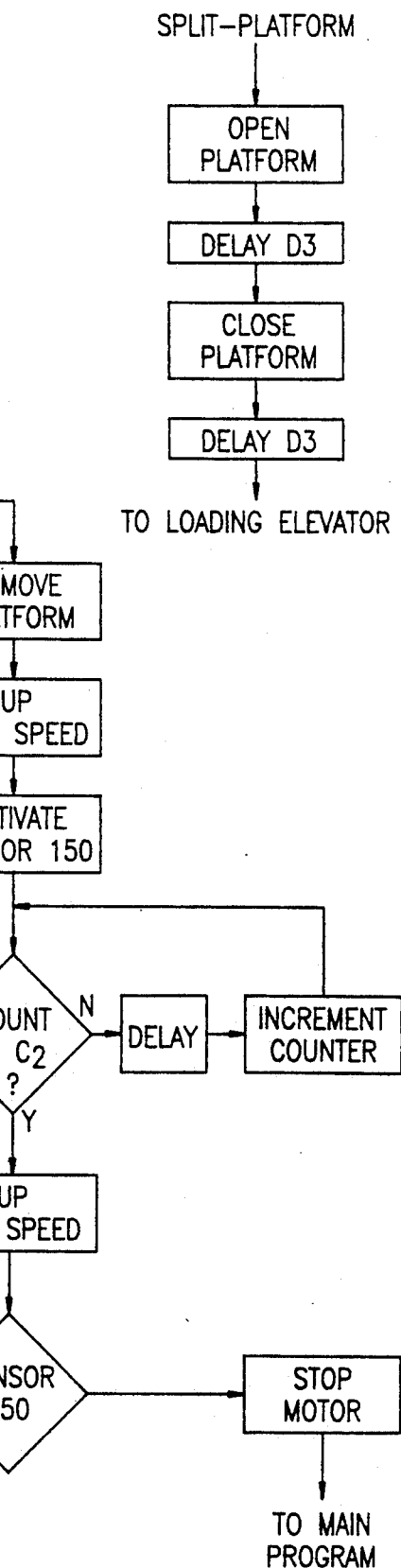

FIG. 2g shows the pusher routine whereupon a signal from the CPU indicating that bundles B1 and B2 have been delivered to the roller sections 28 and 26 and that these roller sections have been halted, the row flag is examined. If the row flag is not set upon examination, it is then set whereupon sensors 52a and 52b are activated. The pusher motor M1 is activated to push the pusher through the maximum stroke to push the bundles B1 and B2 against stop plate 51. Sensors 52a and 52b are examined to determine if a bundle is present. If either bundle is absent, after a delay period, a counter is incremented. The count is then examined and if the count reaches a predetermined value, the system is halted. Once both bundles are indicated as being present, the pusher is returned to the start position and the pusher routine jumps back to the roller section program which, as shown in FIG. 2f activates sensor 28b and activates all of the roller sections 22 through 28 and seeks a bundle. When a bundle is present, section 28 is turned off after a delay D1 and sensor 26b is examined. When a bundle is present on section 26, section 26 is turned off whereupon the program jumps to the pusher routine shown in FIG. 2g. Thus, when the split platform section 50 is loaded with the bundles making up a layer, such as a layer of two-by-two bundles shown in FIG. 2c, the split platform is operated to deliver the layer of bundles deposited thereon into the cart indexed at the loading position.

The split platform assembly 50 is comprised of first and second roller platform sections 54, 56 each comprised of a plurality of free-wheeling rollers whose axial length is sufficient to receive the desired number of rows of bundles, there being a sufficient number of rollers in each split platform section 54 and 56 to collectively accommodate the number of bundles in each row. In the example shown in FIG. 2c, each split platform section is capable of supporting two bundles, the platform section being capable of supporting bundles B1 and B3 and platform section 52 being capable of supporting bundles B2 and B4.

Each split platform section is moved by a cylinder 58, 60 respectively associated with each split platform and having a piston rod 58a, 60a coupled to the platform, each cylinder being adapted to move the split platform sections together as shown in FIG. 3 preparatory to receiving bundles and for rapidly driving the split platform sections apart as shown by the arrows A2 and A3. See the program routine of FIG. 2h. The split platform sections 54 and 56 are moved apart rapidly enabling the bundles deposited thereon to fall by gravity into the cart presently indexed at the loading position and ultimately onto the platform 112.

FIGS. 2a and 2b show two different perspective views of a cart 70 utilized in the automatic loading system 10 and comprised of a floor or platform P supported by a plurality of rugged, durable casters 72 provided at each corner of the underside of platform P. The casters are mounted for rotation about a vertical axis 73 as shown by arrow A4 in FIG. 2b.

Cart 70 has three fixed sides 74, 76 and 78, each having a substantially rectangular-shaped frame 74a, 76a, 78a provided with intermediary, integral cross pieces 74b-74c, 76b-76c and 78b-78c. A plurality of vertically aligned, spaced, parallel bars 74d, 76d and 78d are secured to the upper horizontal member of the frames 74a, 76a and 78a and the horizontal members 74b, 76b and 78b, respectively. Similar groups of vertically oriented, spaced, parallel bars 74e, 76e, 78e and 74f, 76f, 78f are similarly secured to associated horizontal members of each sidewall, yielding an open, cage-like cart and yet one having sufficient inherent structural strength to provide a rugged cart capable of withstanding heavy-duty use. If desired, the vertical bars may be one-piece members extending between the upper and lower horizontal members of each sidewall frame and extending through the reinforcing members 74b, 76b, etc.

The fourth sidewall 80 is comprised of a pair of hingedly mounted doors 82, 84 each having a rectangular-shaped frame 82a, 84a, each provided with hinges, such as the hinges H for swingably moving the doors between a closed (solid line) position and any one of a variety of open positions shown in dotted line fashion as 82', 82" and 82''' and 84', 84" and 84'''. Each door is provided with vertically oriented, spaced, parallel uprights 82b and 84b respectively secured to the upper and lower horizontally aligned portions of frames 82a and 82b. The doors may be retained in the locked position by a pair of locking means 86 and 88 each having a locking bolt 86a, 88a arranged on frame 84a into an associated receiving housing 86b, 88b for receiving its associated sliding bolt. Any other suitable type of releasable locking means may be utilized. In addition, or as an alternative to the locking means described hereinabove, similar sliding bolts may be provided at the lower inside portion of each frame and comprising a sliding bolt for slidable movement into an opening provided in platform P Note, for example, FIG. 2b showing a locking means 90 provided on the inside frame 84a of swingable door 84 and provided with a sliding bolt 90a movable into an opening O in platform P. Although not shown for purposes of simplicity, similar locking means may be provided along the lower interior side of door 82.

FIG. 2k shows another self-locking arrangement wherein each door frame, such as frame 84a is provided with an opening for receiving a latch pin 91. A cover plate 93 is mounted upon the surface 84a-1 of frame 84a and is secured thereto by fasteners F. Plate 93 has an opening aligned with the opening in frame 84a. Platform P also has an opening aligned with the pin 91, extending through plate 93 and frame 84a, when the door is in the closed position. Pin 91 has an enlarged head portion 91a and an annular shoulder 91b. A helical bias spring SP engages plate 93 and shoulder 91b, urging pin 91 downwardly toward the locked position. The pin is removed from (or returned to) the locking hole in platform P simply by gripping head 91a and lifting pin 91 upwardly against the force of bias spring SP.

The structure of the doors 82 and 84 differs from the remaining sidewalls 74-78 of the cart in that horizontal reinforcing members have been omitted from the doors to enable insertion and unimpeded vertical sliding movement of the fork-like platform within the cart, as will be described hereinbelow in greater detail.

Although the preferred embodiment of the cart 70 shown in FIGS. 2a and 2b comprises a door for receiving the fork-like platform, the doors may be provided with horizontal reinforcing members and one of the sidewalls may be adapted to receive the fork-like platform by eliminating the horizontal reinforcing members.

The cart may further be modified by replacing the pair of double doors with a single door or alternatively, with upper and lower single doors or two pair of double doors to facilitate a variety of options for facilitating unloading of the carts. As was mentioned hereinabove, the carts may handle four bundles or six bundles per layer (respectively arranged two-by-two or two-by-three) or even nine bundles per layer (arranged three-by-three). The double doors permit removal of the contents of half of the layers at one time. One typical cart has a height of the order of five foot two inches and is capable of receiving five to seven layers per cart. The carts are preferably rated for twelve hundred pound loads. Assuming six two-by-three layers for a total of thirty-six bundles with a weight of twenty-six pounds per bundle, the total weight of the load is less than one thousand pounds, well within the rating of the cart.

The carts 70 may be made collapsible in order to permit a larger number of empty carts to be returned by truck to the loading dock for return to the loading system 10. The bottom of platform P may be hingedly mounted by hinges 79 enabling the platform P to be swung upwardly against sidewall 78 (see FIG. 2b). In this particular case, the casters 72 are mounted to the side frames. With the floor platform P raised in the manner described, doors 82 and 84 are swung apart and against the exterior surfaces of sidewalls 74 and 78 respectively. Sidewall 76 folds in half about hinges 81 to significantly reduce the "footprint" made by the cart, enabling a large number of carts to be loaded into the truck cargo space. The cart may then be unfolded to the position shown, for example, in FIG. 2a by reversing the order of steps undertaken to collapse the cart, preparatory to loading bundles into the cart.

FIG. 1 shows the manner in which the carts are arranged and indexed in the automated loading system.

System 10 is provided with a pair of elongated, channel-shaped cart guides 92 and 94 having outwardly tapered sides 92a, 94a which facilitate guiding of the cart casters 72 into the channel guides. The guides 92, 94 are shown as being filled to capacity with four carts, 70, 70', 70" and 70'". A cart 70"", shown in dotted fashion, is pushed up against the last cart 70 to enter into the guides in readiness for automatic advancement. A drive motor 96 is provided with a sprocket wheel 98 having a chain 100 entrained around drive sprocket 98 and a driven sprocket 102 rotatably mounted upon a support bracket 104 by shaft 106. Motor 96 drives chain 100 in the direction so that its upper run moves in the direction of arrow A4. A plurality of pusher members 108 are arranged in spaced intervals along the length of chain 100 (note also FIGS. 1a and 1b) and have a forward surface 108a for engaging the lower frame portion of frame 74a forming sidewalls 74. The pushers 108 are arranged at spaced intervals each interval, being greater than the width W of a cart measured along the sidewall of the cart carrying the door. When a cart has been filled by the loading system 10, motor 96 is operated to advance each pusher along the upper run of chain 100 a distance equal to approximately one cart length to advance the cart (70") in the loading position to the position occupied by cart 70'". Carts 70 and 70' are likewise advanced to occupy the positions shown by carts 70" and 70' thus allowing space for one additional cart to be pushed onto the guides 92, 94. The cart 70"" may now be manually pushed into the guides to occupy the position shown by cart 70. The pushers 108 are hingedly coupled to chain 100 by angle bracket 109 and a coupling pin 111 enabling the pushers to swing in the counterclockwise direction (see FIGS. 1a and 1b) to be swung downwardly and out of the way of the cart 70"" being pushed onto the guides 92, 94. Recess 108b in pusher 108 receives the chain 100 enabling the pusher 108 to move downwardly and out of the path of a cart. As soon as the cart is clear of the pusher 108, the spring loading mechanism provided therein comprising a torsion spring 113 having an arm 113a resting against the rear end of pusher 108 and an arm 113b coupled to the horizontal portion of angle bracket 109 permits the pusher to swing counterclockwise and snaps the pusher to the upright position when the pusher clears the bottom of a cart. The upright portion 109a of bracket 109 is engaged by the rearward end of pusher 108 preventing the pusher from rotating clockwise when in the upright position.

Any other mechanisms utilized for swingably moving the pushers in a first direction, snapping them upwardly and preventing the pushers from rotating counterclockwise when in the upright position may be utilized and details therefor have been omitted herein for purposes of simplicity.

As was described hereinabove, after a layer of bundles has been delivered to the split platform, cylinders 58 and 60 are operated to abruptly move the platform halves 54 and 56 apart causing the bundles on the platforms to be "scraped" from their respective supporting platform halves by the limit bars 57 and 59 which prevent the bundles from moving beyond the limit bars, thereby "scraping" the bundles off of the split platform halves and causing them to drop downwardly into the cart being loaded. The platform halves have free-wheeling rollers which significantly reduce sliding friction between the bundles and the platform sections. However, planar platform sections having a low coefficient of sliding friction may be employed.

The layer of bundles is prevented from dropping to the bottom of the cart and, in fact, falls a distance of only several inches, the bundles coming to rest upon the tines 112a of a fork-like platform 112 forming part of the cart loader elevating mechanism 110 which is comprised of an elongated substantially rectangular-shaped frame 114 which is substantially vertically aligned and maintained upright by means of an integral bracing frame 116 comprised of a base member 116a and diagonally aligned struts 116b, 116c. A drive motor 118 is utilized to raise and lower the fork-like platform 112. Motor 118 is preferably a qualified brake motor which has an important safety feature in that the brake engages whenever the power is turned off or fails thereby preventing the fork-like platform 112 from accidentally dropping from an elevated position. Motor 118 is preferably a two speed device, for example, a thirty-six hundred/nine hundred rpm motor driving an output gear 122 through gear box 120 which is a self-locking gear box having a gear ratio of forty to one, also preventing the platform from moving the input shaft of the gear box when the motor is off. Output gear 122 drives a driven gear 124 mounted upon drive shaft 126 by means of chain 128. A pair of drive sprockets 130 and 132 are fixedly secured to shaft 126 together with driven sprocket 124 whereby rotation of driven sprocket 124 is imparted to drive sprockets 130 and 132 by way of shaft 126. Each of the drive sprockets 130 and 132 impart rotation to a pair of driven sprockets 134, 136 by way of chains 138, 140 respectively, each driven sprocket being freely rotatably mounted upon an associated support bracket (142, 144) by means of a stump shaft 146, 148. Two-speed bidirectional motor 118 operates to drive the fork-like platform up and down in the following manner:

Initially, let it be assumed that the fork-like platform 112 is located at the uppermost position approximately four inches below the split platform assembly 50 with the fork-like platform extending into the cart. A layer of bundles is dropped from the split platform onto the fork platform and, after a predetermined delay, the program jumps over to the loading elevator routine shown in FIG. 2j. Initially, assuming the platform 112 be located at its upper extreme position, approximately four inches below the split platform 50, delay D3 is selected to be sufficient to assure that the bundles of the present layer have dropped upon the platform 112 whereupon motor 118 is operated at its high speed. A sensor 150a is activated and a counter is examined. If the counter has not reached the predetermined count, after a predetermined delay, the counter is incremented by one count. The program continues to loop therearound until the count C2 is reached at which time motor 118 is changed to low speed and sensor 150a is examined. When sensor 150a detects the presence of the platform 112, power to the motor is turned off, automatically braking the motor and the routine then returns to the main program.

Figure 4:
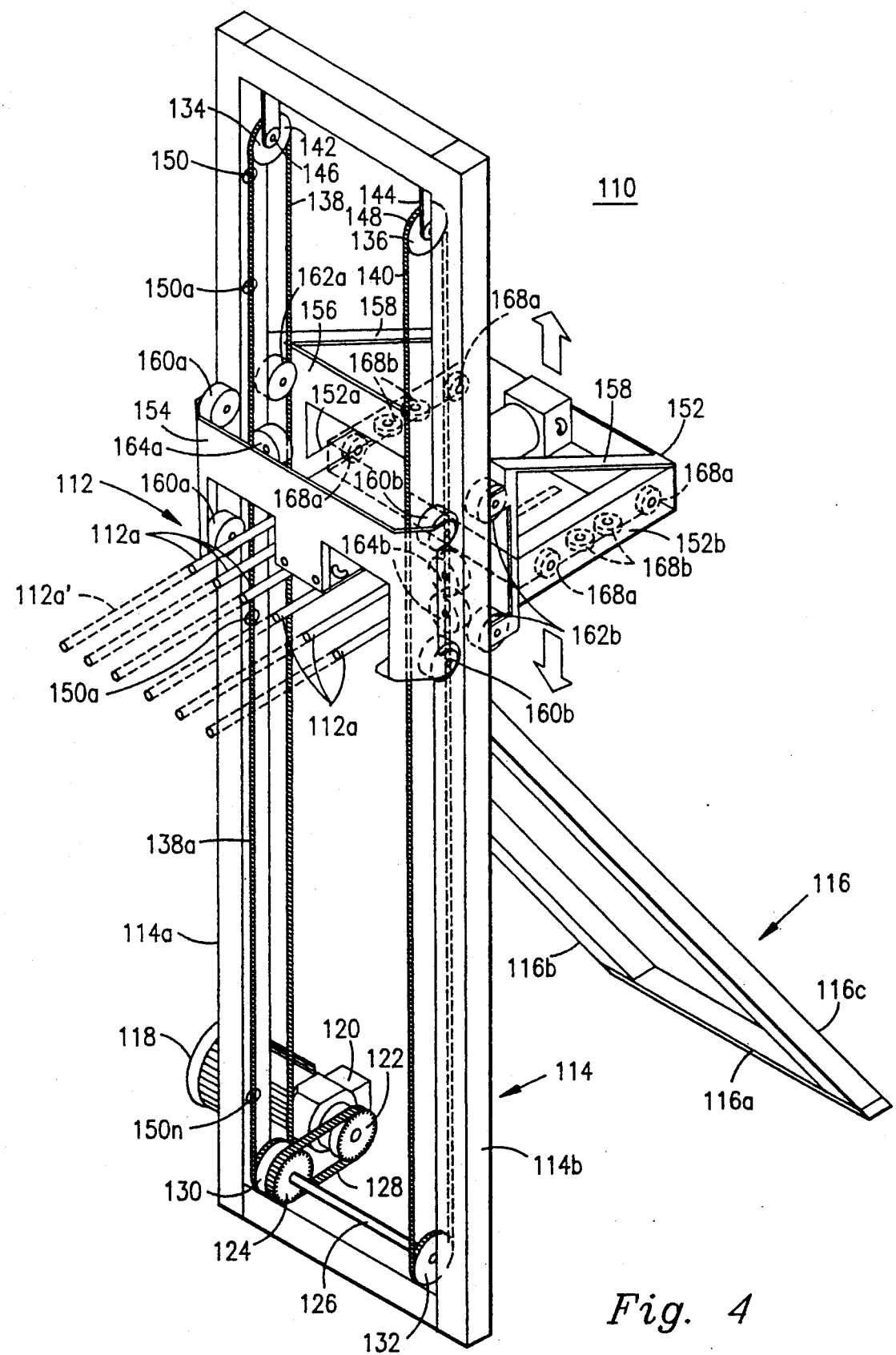
FIG. 4 is a perspective view showing the elevator assembly of FIGS. 1 and 4 in greater detail.

When the next layer of bundles is deposited upon the layer of bundles previously loaded upon platform 112, the downward movement described hereinabove is repeated utilizing the next sensor 150b. Similar sensors are positioned at set intervals along the left-hand side of frame 114, for example, with the lowermost sensor 150n being shown in FIG. 4.

FIG. 1d shows an alternative arrangement for the elevator assembly 110 employing upper and lower limit switches SW1 and SW2, upper home and near-home switches HSW1 and NHSW1 and lower home and near-home switches HSW2 and NHSW2. The lowering of platform 112 is controlled by photocells such as PC below split platform 50 (shown in dotted fashion in FIG. 1d) to look for clearance of the last layer of bundles being lowered.

As another alternative, motor 118 may be a velocity controlled variable speed motor employed in combination with an external "fail-safe" brake. In place of selective operation at a high and low speed, the variable speed motor is controlled by a software routine which accelerates from a standstill, maintains a constant speed, decelerates to a lower speed as the near home switch (FIG. 1d) is detected and then turns off and brakes to a stop upon sensing the home switch.

As another alternative, the layers may each be delivered individually into the cart by having the platform 112a receive a layer of bundles, lowering the layer to the bottom of the cart (or upon the last layer delivered to the cart) and return to the start position just below the split platform 50.

Platform 112 is mounted upon a movable frame 152 having a substantially U-shaped configuration. One run, for example, the run 138a of chain 138 is secured to frame 152 by suitable coupling means to move the frame either upwardly or downwardly in the vertical direction under the control of motor 118. A pair of guide frames 154 and 156 are joined to one another along the internal sides of the frame uprights 114a and 114b as well as joining struts 158. Frames 154 and 156 each have two pairs of wheels that are preferably urethane coated wheels 160a, 162b which are respectively rollingly mounted to spaced parallel sides of the frames 154 and 156 to rollingly engage opposite surfaces of the frame uprights 114a, 114b which are preferably formed of four inch by four inch rectangular steel tubing. The four sets of wheels 160a through 162b prevent the frame assembly supporting platform 112 from moving in the horizontal direction relative to frame 114.

Two pairs of wheels 164a, 164b are arranged to rollingly engage the interior surfaces of frame members 114a and 114b to centrally align the cart upon which the platform 112 is mounted between the uprights 114a, 114b and to prevent horizontal movement of the cart relative to the vertical frame 114. Thus the sets of wheels 160a through 164b prevent horizontal movement of the cart assembly 152 in mutually perpendicular directions relative to frame 114.

The two parallel sides 152a, 152b of the frame structure 152 are hollow, channel-shaped members for slidably receiving a housing 166 from which the fork-like tines 112a extend and to which the tines are integrally joined. The rectangular parallelepiped-shaped housing 166 is provided with two pairs of wheels arranged on opposite parallel sides thereof. A first pair of outer wheels 168a rollingly engage the top and bottom horizontally aligned surfaces of the channel-shaped frame portion 152b. A second pair of wheels 168b arranged to rotate about vertically oriented axes which are perpendicular to the horizontally oriented axes about which rollers 168 rotate, rollingly engage the interior surface of the vertical side of the channel-shaped portion 152b. These two pairs of wheels prevent relative movement of the housing 166 in both the horizontal and vertical direction relative to frame 152. Similar pairs of wheels 168a and 168b are provided along the left-hand side of housing 166 and function in a manner substantially identical to the pairs of wheels arranged along the right-hand side of housing 166.

Figure 4A:
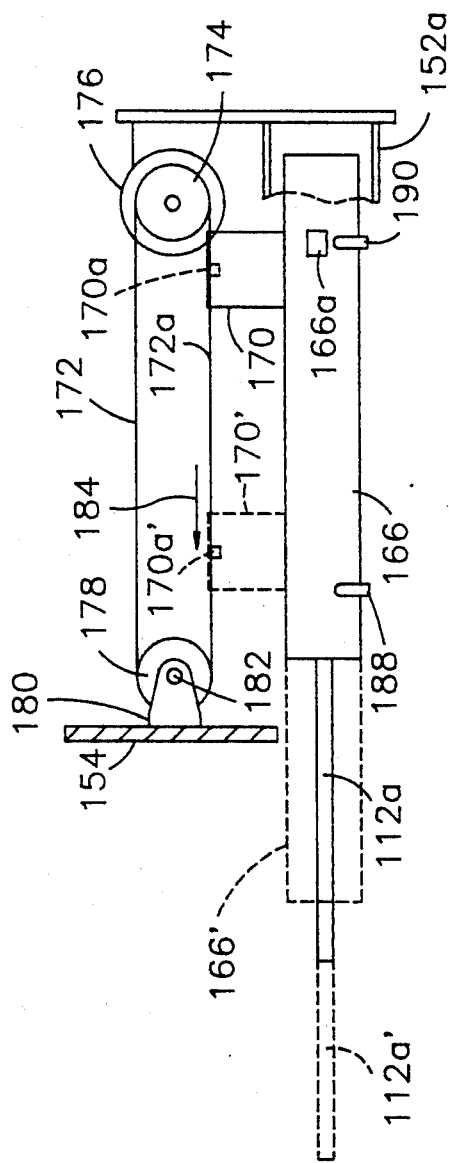
FIGS. 4a and 4b respectively show side and end views of a rodless cylinder assembly for operating the fork-like platform of FIG. 4.

The top of housing 166 is provided with a projection 170 for mechanical coupling to the lower run of a timing belt 172 (see FIG. 4a) entrained about a drive timing belt pulley 174 driven by motor 176 and a driven timing belt pulley 178 rotatably mounted to frame member 154 by bracket 180 and shaft 182. Projection 170 is secured to the lower run 172a of timing belt 172 by suitable coupling means 170a. By rotating motor 176 clockwise, the lower run 172a is moved to the left as shown by arrow 184 to extend tines 112a into the cart arranged within the loading position as shown by dotted line position 112a' in FIGS. 4 and 4a It should be noted that the carts are arranged so that the door members 82, 84 (see FIG. 2a) are positioned adjacent to the elevating mechanism 110. The tines 112a thus move into the cart without interference.

The motor 176 may be any suitable motor and may be abruptly halted when a predetermined element 166a, such as a magnet, is sensed by proximity sensors 188 and 190 to respectively indicate when the housing 166 and hence tines 112a have been moved to the fully-inserted 9112a') and fully-withdrawn (112a) position relative to a cart being loaded. If desired, a similar arrangement may be provided on frame 152 and frame 114 wherein sensors 150—150n may be proximity switches for sensing a magnet or ferromagnetic member arranged on frame 152.

Summarizing the operation of the elevating mechanism, and assuming that a cart has just been fully loaded, platform 112 will be located at the bottommost position whereupon motor 176 is operated to withdraw platform 112 from the cart. The bars 82b, 84b of the loaded cart prevent the bundles loaded therein from being withdrawn from the cart and hence act to "scrape" the bundles off of the platform 112.

As soon as the platform 112 reaches the fully-withdrawn position, element 166a (see FIG. 4a) is detected by sensor 190 whereupon motor 176 is halted and motor 118 is operated at high speed to return the platform to the uppermost position. A predetermined number of counts are accumulated as motor 118 is operating at high speed to lift the platform 112. When the predetermined number of counts has been detected, motor 118 is controlled to operate at the low speed. This position is typically in close proximity to the uppermost sensor 150, for example, whereupon when sensor 150 is detected, motor 118 is deenergized and abruptly brakes to a stop. When the next cart has been indexed into the loading position, motor 176 is activated to move platform 112a into the cart to support the first layer of bundles delivered to the cart. The platform 112 is lowered as each layer of bundles is deposited thereon until the platform is lowered to the lowermost position or any other appropriate position (in the case where a cart is programmed to receive less than the maximum number of bundles) whereupon the platform 112 is delivered to the bottommost position and the platform 112 is withdrawn from the cart by motor 176 and is returned to the uppermost position in readiness for loading another cart under the control of motor 118.

Figure 4B:
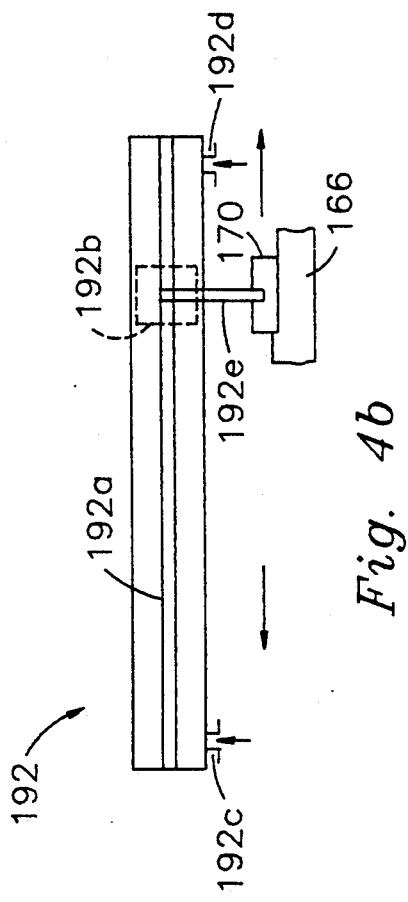

As an alternative to the motor 176 and timing pulley 172, the housing 166 (FIG. 4a) may be reciprocated by means of any other suitable linear actuator such as a hydraulic or pneumatic cylinder or a rodless cylinder as shown, for example, in FIG. 4b. Rodless cylinder 192 is fixedly secured to frame 152 in any suitable manner and is provided with an elongated axially aligned slot 192a. A piston 192b is mounted within cylinder 192. Ports 192c and 192d are provided to receive pressurized pneumatic or hydraulic fluid to respectively move piston 192b to the right or left. An arm 192e is secured to piston 192b and extends outwardly through elongated slot 192a and is coupled to projection 170 provided on housing 166. Slot 192a is sealed with a moving seal to prevent the escape of the pressurized fluid. The sensors 188 and 190 cooperate with the sensed element 166a to control operation of the rodless pusher cylinder 192.

Each cart is provided with a static or active sensing element 200 shown best in FIG. 1 capable of being read by an automatic reader/computer 202. Members 200 may simply be a bar code pattern identifying each cart. This identifying pattern is then associated with the bundles loaded into the cart and their destination. A hand-held sensor 204 at the loading dock (FIG. 1) may then read each bar code pattern which will then provide information as to the destination of the cart, by reading and displaying the data in memory associated with the cart using the cart identifying number as the address in memory storing the data related to the bundles and their destinations. The data generated by the reader/computer 202 may be transferred to the hand-held reader by a data bus 206 or by wireless.

As another alternative arrangement, each identifying member 200 may be a memory device capable of being written into and read by a read-write device 202 to provide information for identifying the destination of the cart and its particular contents. This information may then be read by a hand-held reader 204 at the loading dock which is limited to reading the contents of the element 200 in order to identify with the destination of the cart and its particular contents. The hand-held reader provided at the loading dock and the device 202 may be provided with electronic display means and/or a small printer for printing out the data. This latter embodiment eliminates the need for transfer of data from the computer 202 to the hand-held reader 204.

It can be seen from the foregoing that the present invention provides a novel highly automated loading system for loading bundles or other like packages into a loading cart in an efficient and high-speed manner and significantly reducing, if not almost totally eliminating, the manual activity normally associated with such loading operations thereby significantly reducing loading time and, in fact, reducing the number of trucks needed to carry out delivery since the automated loading system will permit the same trucks to deliver and return multiple loads in the time normally required for delivering a single and load and returning to the loading dock.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for automatically loading a cart comprised of a platform surrounded by sidewalls and having an open top, at least one of said sidewalls having a plurality of vertically aligned elongated clearance slots;
said apparatus comprising:
a loading station for receiving and positioning said cart;
means for receiving bundles to be loaded into said cart;
conveyor means adjacent said receiving means for conveying the bundles received from said receiving means to a location a predetermiend height above an open end of said cart at said loading station;
a platform assembly for receiving bundles from said conveyor means;
said platform assembly being comprised of a plurality of sections;
means for selectively advancing bundles along said sections including means to halt the advancing of bundles on each section responsive to detection of a bundle on said section;
pusher means responsive to the presence of bundles upon predetermiend ones of said sections for pushing said bundles in a transverse direction onto a split platform means;
said split platform means comprising first and second platform sections movable between a closed position wherein adjacent edges of said platform sections are in close proximity and an open position wherein said sections are moved apart to define a gap region between said split platform sections;
said gap region being positioned immediately above the open end of said cart; and
means responsive to delivery of bundles by said pusher means upon said split platform assembly for moving said split platform sections apart whereupon the bundles resting thereon are dropped through said gap region toward said cart.

2. The apparatus of claim 1 wherein said split platform means has a supporting surface area large enough to receive a plurality of groups of bundles form said platform assembly wherein each group of bundles comprises a predetermined number of bundles collected upon said platform assembly;
said pusher means pushing a first group of said bundles to a first position on said split platform furthest removed from said platform assembly; and
said pusher means moving a next group of bundles delivered to said platform assembly to a location upon the surface of said split platform means located between said platform assembly and the first group of bundles delivered to said split platform means.

3. The apparatus of claim 2 further comprising:

means for operating said split platform means comprising a pair of air cylinders each having a piston movable therein responsive to pressurized fluid applied to said cylinder;

each piston means including rod means with a first end extending into said cylinder for coupling with said piston and a second end pivotally coupled to an associated one of said split platform sections for reciprocating said split platform sections.

4. The apparatus of claim 1 wherein the number of sections provided is greater than a number of bundles pushed onto said split platform means by said pusher means.

5. The apparatus of claim 4 wherein the number of sections is twice the number of bundles pushed onto said split platform means from said platform assembly by said pusher means.

6. The apparatus of claim 1 further comprising:

movably mounted platform means having a plurality of spaced substantially parallel tines cooperatively forming a fork-like platform;

means for reciprocating said fork-like platform in a substantially horizontal plane from a first position wherein said fork-like platform is inserted into the sidewall of a cart provided with said vertically oriented insertion slots, and a second position wherein said fork-like platform is totally withdrawn from said cart;

means for reciprocating said fork-like platform in a vertical direction between an upper and a lower position; and means for moving said fork-like platform in a downward direction after the bundles delivered by the split platform means are dropped upon said fork-like platform responsive to opening of said split platform sections.

7. The apparatus of claim 6 further comprising:

means for moving the cart from the loading station and moving a cart adjacent to the loading station into the loading station responsive to removal of said fork-like platform from the cart in the loading station.

8. The apparatus of claim 6 further comprising:

means for reciprocating said fork-like platform in a vertical direction including bidirectional, two-speed motor means; and means responsive to an output of said motor means for moving said fork-like platform.

9. The apparatus of claim 8 further comprising control means for said motor means for moving said motor means at a first, higher speed and for operating said motor means at a second lower speed when said fork-like platform has a travelled a predetermined distance from a desired location.

10. The apparatus of claim 8 wherein said motor means is a qualified brake motor means including brake means which is engaged when power is removed from said motor means.

11. The apparatus of claim 8 wherein said means for horizontally reciprocating said fork-like platform comprises:

a rodless cylinder means having an output member coupled between said platform means and piston mounted within said cylinder;

said cylinder having an elongated axially aligned slot said coupling means moving along said slot;

said slot being sealed to prevent an escape of pressurized fluid introduced into said cylinder; and said cylinder being provided with control ports for controlling a direction of movement of said piston according to the pressurized fluid selectively introduced into said ports.

12. The apparatus of claim 6 wherein said means for reciprocating the fork-like platform in a substantially horizontal plane comprises:

motor means;

means responsive to the operation of said motor means for rotating a drive gear;

a freely rotatable driven gear;

a pulley entrained about said drive and driven gears; and means for coupling a first run of said pulley to said movably mounted platform means.

13. The apparatus of claim 6 further comprising:

means for reciprocating said fork-like platform in a horizontal direction including bidirectional, variable speed motor means; and means responsive to an output of said motor means for moving said fork-like platform.

14. The apparatus of claim 13 further comprising "fail-safe" brake means for selectively braking said variable speed motor means.

15. The apparatus of claim 1 wherein said pusher means comprises:

a pusher member;

elongated guide members;

a housing slidable along said elongated guide members;

means extending from said housing for mounting said pusher member;

motor means; and means coupled to motor means for moving said pusher means from a start position adjacent one side of said roller platform assembly toward said split platform means.

16. The apparatus of claim 15 wherein said means for coupling drive from said motor means and said pusher means further comprises:

means responsive to the operation of said motor means for rotating a drive gear;

a freely rotatable driven gear;

a pulley entrained about said drive and driven gears; and means for coupling a first run of said pulley to said housing.

17. The apparatus of claim 16 wherein said motor means is a bidirectional motor.

18. The apparatus of claim 1 wherein said carts are comprised of at least one releasably lockable door hingedly coupled to said cart along one side thereof and swingable between an open and a closed position; and locking means for selectively locking said door in said closed position.

19. The apparatus of claim 18 wherein said door comprises the sidewall provided with said elongated inserting slots.

20. The apparatus of claim 19 wherein said elongated insertion slots are defined by a rectangular-shaped door frame having a plurality of rigid elongated spaced parallel members secured to an upper and a lower side of said door frame wherein regions between adjacent members and between vertical sides of said door frame and said members comprise said insertion slots.

21. The apparatus of claim 1 wherein at least one sidewall of said carts comprises:

first and second swingably mounted doors movable between a closed position and an open position; and means for selectively locking said doors in the closed position.

22. The apparatus of claim 1 wherein each of said carts is provided with identification means;

reading means for reading said identification means on said cart means and means for associating the identification means with contents of the cart and the destination for said contents; and remote reading means coupled to said central reading means for obtaining information from said central reading means for identifying the cart for a particular destination and including reading means for reading said carts to determine an identity of the cart and data associated with said destination.

23. The apparatus of claim 1 further comprising:

guide means for guiding said cart toward a loading position;

means for automatically advancing the carts in said guide means toward said loading position responsive to completion of loading of a cart in the loading position.

24. The apparatus of claim 23 wherein said cart advancing means comprises:

a drive means;

a drive chain entrained about a first gear coupled to said drive means and a second free-wheeling gear;

pusher members coupled to said chain at spaced intervals therealong for moving a said cart engaged by said pusher means.

25. The apparatus of claim 24 wherein said pusher means comprises:

means for enabling each pusher means to swing downwardly when moved by a cart in a cart advancing direction to provide clearance for pushing the cart onto said guide means and bias means for automatically moving said pusher means to an upright position when said pusher means clears the cart; and means preventing each pusher means from rotating in a second direction when in the upright position, thus assuring each pusher means pushes a cart in a forward indexing direction when the indexing drive motor means is energized.

26. The apparatus of claim 1 wherein said bundles are packages.

27. The apparatus of claim 1 wherein said bundles are each comprised of newspapers wrapped to form a bundle.

28. The apparatus of claim 1 wherein the conveyor means lifts the bundles toward a location above the cart.

29. The apparatus of claim 1 wherein the conveyor means lowers the bundles toward a location above the cart.

30. The apparatus of claim 1 wherein said platform assembly is a roller platform assembly and said sections comprise roller sections.

31. The apparatus of claim 30 wherein said means for selectively advancing bundles along said sections further comprises means for selectively rotating the rollers of said roller sections.

32. Carts for use in a system for automatically loading said carts including a platform arranged above a loading position for receiving a cart therebeneath;

said platform having a delivery opening whereby a cart in the loading position has an upper end thereof aligned with said openings;

split platform means comprising first and second platform sections movable between a first position closing said opening for receiving the bundles thereon and a second position for unsealing said opening;

stop means on opposite parallel sides of said opening for limiting movement of objects on said platform sections as they are moved to said second position whereby objects on said platform sections are caused to fall downwardly through said openings;

means for delivering and arranging bundles upon said platform sections when in said first position;

said cart being comprised of a platform;

caster assemblies mounted upon the underside of said platform for rollingly moving said platform upon a supporting surface;

a plurality of sidewalls extending upwardly from said platform for enclosing said platform;

said cart having an open upper end defined by the upper ends of said sidewalls;

at least one of said sidewalls being provided with a plurality of elongated spaced vertically aligned insertion slots adapted to receive a fork-like platform having a plurality of spaced parallel tines and being movable between a first position wherein said tines are inserted into respective ones of said insertion slots and a second position wherein said tines are withdrawn from said cart; and means for moving said platform downwardly through a predetermined distance responsive to bundles being dropped upon said fork-like platform through said delivery opening.

33. The apparatus of claim 32 wherein at least one of the sidewalls of said cart comprises a hingedly mounted door to facilitate unloading of bundles therefrom.

34. The apparatus of claim 32 wherein at least one of the sidewalls of said cart comprises a pair of hingedly mounted doors to facilitate unloading of bundles therefrom.

35. The apparatus of claim 34 further comprising releasable locking means for selectively retaining the hingedly mounted doors in a locked position.

36. The apparatus of claim 34 wherein said insertion slots are provided in said doors.

37. The apparatus of claim 32 further comprising means for hingedly mounting said platform and at least two opposing sidewalls thereof to facilitate collapsing of said cart.

38. The apparatus of claim 32 further comprising horizontal reinforcing means for reinforcing all of said sidewalls except the sidewall having said insertion slots to enhance structural strength of said cart.

39. Apparatus for automatically loading a cart comprised of a platform surrounded by sidewalls and having an open top, at least one of said sidewalls having a plurality of vertically aligned elongated clearance slots;

said apparatus comprising:

a loading station for receiving and positioning said cart;

means for receiving bundles to be loaded into said cart;

conveyor means adjacent said receiving means for conveying the bundles received from said receiving means to a location a predetermiend height above an open end of said cart at said loading station;
a platform assembly for receiving bundles form said conveyor means;
said platform assembly being comprised of a plurality of sections;
means for selectively advancing bundles along said sections including means to halt advancing of bundles on each section responsive to detection of a bundle on said section;
pusher means responsive to a presence of bundles upon predetermined ones of said sections for pushing said bundles in a transverse direction onto a split platform means;
said split platform means comprising first and second platform sections movable between a closed position wherein adjacent edges of said platform sections are in close proximity and an open position wherein said sections are moved apart to define a gap region between said split platform sections;
said gap region being positioned immediately above the open end of said cart; and
means responsive to delivery of bundles by said pusher means upon said split platform assembly for moving said split platform sections apart whereupon the bundles resting thereon are dropped through said gap region toward said cart;
said cart being comprised of:
caster assemblies mounted upon an underside of said platform for rollingly moving said platform upon a supporting surface;
a plurality of sidewalls extending upwardly from said platform for enclosing said platform;
said cart having an open upper end defined by the upper ends of said sidewalls;
at least one of said sidewalls being provided with a plurality of elongated spaced vertically aligned insertion slots adapted to receive a fork-like platform having a plurality of spaced parallel tines and being movable between a first position wherein said tines are inserted into respective ones of said insertion slots and a second position wherein said tines are withdrawn from said cart; and
means for moving said platform downwardly through a predetermined distance responsive to bundles being dropped upon said fork-like platform through said delivery opening.

* * * * *

UNITED STATES PATENT AND TRADEMARK OFFICE
CERTIFICATE OF CORRECTION

PATENT NO. : 5,181,820
DATED : January 26, 1993
INVENTOR(S) : Sjogren et al.

It is certified that error appears in the above-identified patent and that said Letters Patent is hereby corrected as shown below:

Column 5, line 37, after "the" insert --elevator--

Column 11, line 30, delete "wheel"

Column 14, line 45, change "9112a')" to --(112a')--

Column 16, line 55, change "form" to --from--

Column 17, line 53, before "travelled" delete "a"

Column 21, line 3, change "form" to --from--

Signed and Sealed this

Fourteenth Day of December, 1993

Attest:

BRUCE LEHMAN

*Attesting Officer*   Commissioner of Patents and Trademarks